United States Patent [19]

Louthan

[11] 4,167,077
[45] Sep. 11, 1979

[54] FISHING BOBBER

[76] Inventor: Clissolde L. Louthan, 9024 NE. Oregon St., Portland, Oreg. 97220

[21] Appl. No.: 872,068

[22] Filed: Jan. 25, 1978

[51] Int. Cl.² ........................................... A01K 93/00
[52] U.S. Cl. .................................. 43/44.88; 43/44.95
[58] Field of Search ............... 43/44.87, 44.88, 44.92, 43/44.95

[56] References Cited

U.S. PATENT DOCUMENTS

| | | | |
|---|---|---|---|
| 2,547,308 | 4/1951 | Dean | 43/44.87 X |
| 2,592,441 | 4/1952 | Louthan | 43/44.88 X |
| 2,842,886 | 7/1958 | Williams | 43/44.87 |
| 3,037,318 | 6/1962 | Schultz | 43/44.87 |
| 3,214,858 | 11/1965 | Louie | 43/44.88 X |
| 3,323,247 | 6/1967 | Murray | 43/44.87 X |
| 3,694,951 | 10/1972 | Modeme | 43/44.88 X |
| 3,875,695 | 4/1975 | Futch | 43/44.88 |

Primary Examiner—Nicholas P. Godici
Attorney, Agent, or Firm—Eugene M. Eckelman

[57] ABSTRACT

An elongated buoyant body portion has a slot in the lower end thereof which tapers upwardly to a narrowed dimension. This lower portion of the body includes a guide passageway for a fish line in an arrangement such that when the body portion is disposed in a normal horizontal floating position, the fish line which extends through the slot and over a guide edge in the guide path is freely movable through the bobber but when the bobber is disposed in an upright floating position, such as when it is under the influence of opposed pulling forces, the fish line is gripped by the slot and stopped. The structure of the bobber allows for controlled movement of the line therethrough to position a hook at a desired hanging distance from the bobber and also to release the bobber from the line when a fish strikes.

3 Claims, 11 Drawing Figures

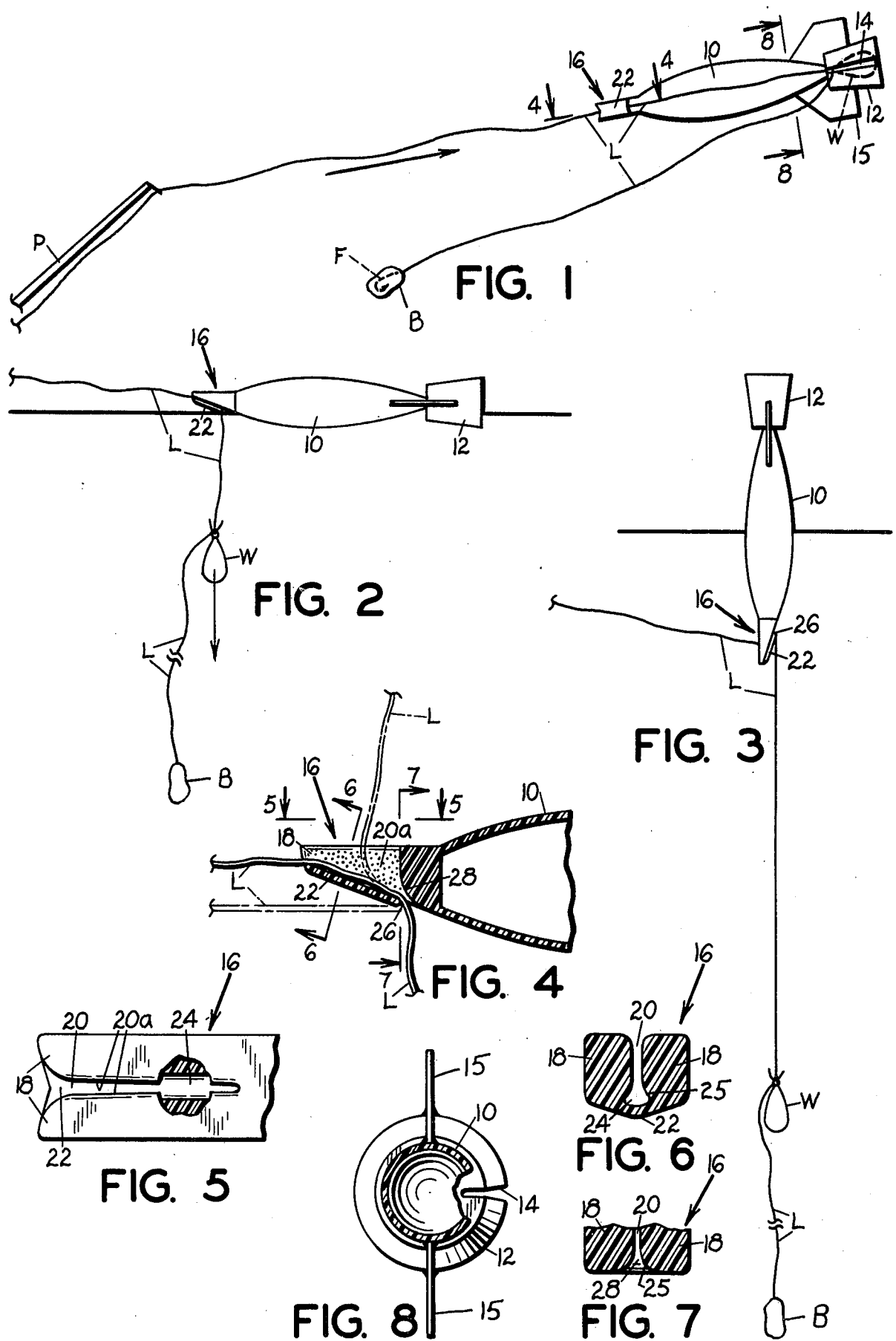

FISHING BOBBER

BACKGROUND OF THE INVENTION

This invention relates to new and useful improvements in fishing bobbers.

Fishing bobbers or floats have heretofore been provided for supporting a fish hook a selected depth in the water. Some of such bobbers have included fish line release means which release the bobber from the line when a fish strikes so that the bobber will not interfere with landing the fish. Such types of bobbers are shown in U.S. Pat. No. 2,547,308 and No. 3,037,318. A bobber structure has also been proposed in U.S. Pat. No. 2,842,886 which allows a fisherman to cast the float and let out line a selected distance dependent upon water inlet of a water chamber in the bobber.

Although the prior art structures as mentioned perform functions for their own particular purpose, they do not provide any appreciable control by the fisherman in placing a hook a selected distance from the bottom, and such is particulary true after the float has once been cast into the water.

SUMMARY OF THE INVENTION

According to the present invention and forming a primary objective thereof, a fishing bobber structure is provided that overcomes deficiences in the prior art in that it serves effectively as a casting and fishing float and at the same time allows control by the fisherman as to the depth that the hook is to be lowered in the water.

The objectives of the invention are accomplished by an elongated buoyant body portion having a cup portion to receive the weight when casting and also having a nose portion provided with a slot and guide means engageable by the fish line. The slot is tapered to a narrowing portion of less width than the diameter of the fish line and the guide is arranged with a portion thereof beyond the slot whereby in a horizontal position of said body portion the fish line is released from the slot to allow fish line movement through the bobber and in an upright position of said body portion the fish line is forced into gripping engagement with said slot to stop its stripping movement through the bobber.

BRIEF DESCRIPTION OF THE DRAWINGS

FIG. 1 is an elevational view of the present bobber and showing it in a function of being cast by a fishing pole;

FIG. 2 is an elevational view of the bobber showing it in a horizontal floating position wherein fish line can strip therethrough; FIG. 3 is an elevational view of the bobber showing it in a vertical position wherein the fish line is gripped for non-movement;

FIG. 4 is an enlarged sectional view taken on the line 4—4 of FIG. 1;

FIG. 5 is an enlarged fragmentary elevational view taken on the line 5—5 of FIG. 4;

FIG. 6 is an enlarged sectional view taken on the line 6—6 of FIG. 4;

FIG. 7 is an enlarged fragmentary sectional view taken on the line 7—7 of FIG. 4;

FIG. 8 is a sectional view taken on the line 8—8 of FIG. 1;

DETAILED DESCRIPTION OF A PREFERRED EMBODIMENT

Figure 9:
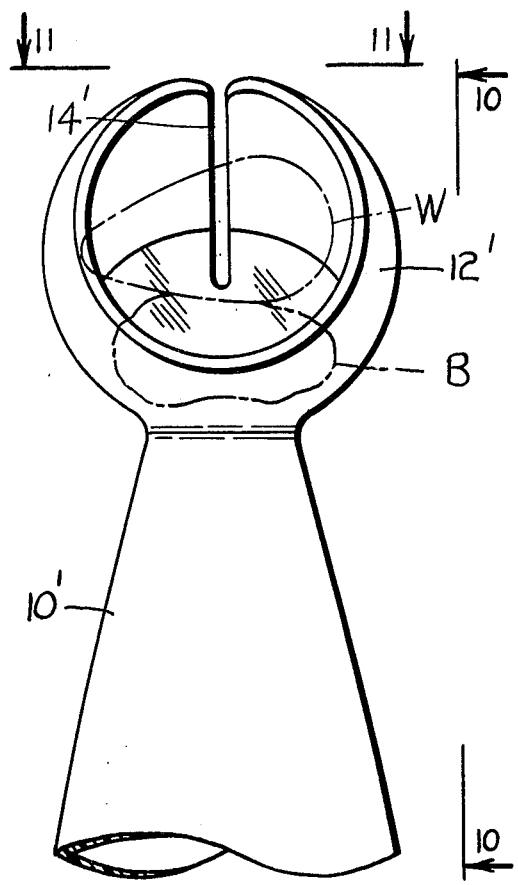
FIG. 9 is a fragmentary side elevational view of a modified form of bobber.

With particular reference to the drawings, and first to FIGS. 1-8, the numeral 10 designates a body portion of a first form of the present bobber. This body portion is buoyant and for this purpose may be hollow or constructed of buoyant material. One end of body portion 10 carries a cup or socket 12 having a slot 14 which extends longitudinally in its side wall and which opens through the free end edge of the cup. As will be seen hereinafter, the cup 12 serves to hold the weight during casting of the assembly into the water with a fish line L. Fins 15 are provided on the body portion 10 adjacent the cup 12 for making the bobber more visible from a distance.

The opposite end 16 of the body 10 comprises a line engaging and control end, and as best seen in the detail views of FIGS. 4-7, such line engaging end comprises a pair of fingers or prongs 18 separated by a space or slot 20 which opens at the free ends of the fingers but which tapers down to nothing away from such free ends. The shape and dimension of the slot are such that the slot will grip any diameter of fish line when the latter is moved a sufficient distance toward the closed end of the slot.

A wall portion 22 is integral with the fingers on the rear side of the latter and a longitudinal passageway 24 is formed between the wall 22 and the rear side of the fingers, the rear portions 25 of said fingers being rounded to provide free stripping of line therethrough as will be more apparent hereinafter. Wall portion 22 has an end edge 26 which is disposed at a point at least as far along the fingers as the closed end of the slot 20. Passageway 24 extends the full length of the slot and has an opening 28 between wall 22 and the body portion 10.

The opposed facing surfaces 20a of the fingers 18 which define the slot 20 comprise friction surfaces for positively gripping a fish line therein. This friction means may comprise a coating of abrasive particles or other friction material that may be adhesively secured in place or if desired these particles may be embedded in the fingers.

In the operation of the present bobber, a fish line L is threaded endwise through the slot 20 from the front, then threaded up the passageway 24 and out the end opening 28 of the passageway. The projecting end of the fish line is connected to the fishing weight W and fish hook F with bait B. When it is desired to cast a line, the line is pulled through the slot 20 an amount sufficient to place the weight in the cup 12, the line being held longitudinally in the passageway 24 at this time to allow it to slide relative to the body portion. The line to the weight extends through the slot 14, and as seen in FIG. 1, the line to the hook hangs free. The weight will stay in the cup when the bobber is cast by a pole P and also when it hangs from the pole before casting. When the bobber is cast the weight will fall out about the time the bobber hits the water. As long as the line from the pole is loose, namely, it is not being retrieved or held tight by the fisherman, the bobber will float horizontally and the line can strip freely through the passageway 24 under the influence of the descending weight.

However, when the fisherman feels that the hook has reached the desired distance from the bottom, he stops the outward play of line from the reel. When this outward stripping of line is stopped, the pull on the fish line between the weight and the pole causes the bobber to stand upright in the water, FIG. 3. Since the top edge 26 of the plate 22 is at least as far along the bobber as the closing end of slot 20, the fish line will always be gripped in the slot when the bobber stands up. Thus, when the fisherman casts the bobber, the line will move through the bobber until such time that the fisherman stops it at the pole, and therefore he can vary the depth of the hook in the water by controlling the stripping of the line off the pole.

If it is desired to raise the weight relative to the bobber when the bobber is in the water, the fisherman reels the line inwardly. Such inward movement of the line reacts with the pull from hanging weight W whereby the body portion 10 is forced to a horizontal position or close to a horizontal position. In such horizontal position, the line is released from the slot and can move relative to the control end of the bobber. By further pulling on the line from the pole, the weight will rise in the water. If it is desired to lower the weight relative to the bobber when the bobber is in the water, the fisherman reels the line inwardly to tip the bobber to its horizontal position. The line to the pole is then released and as long as the line is not stopped at the pole the weight will lower. When the desired length of line to the weight has been let out the fisherman stops the line at the pole. The bobber then tips up to its upright position to stop lowering of the weight.

When a fish strikes the hook, the line is released from the bobber because the pulling force between the pole and the end of the line with the fish thereon causes the bobber to tip to a horizontal position.

Figure 10:
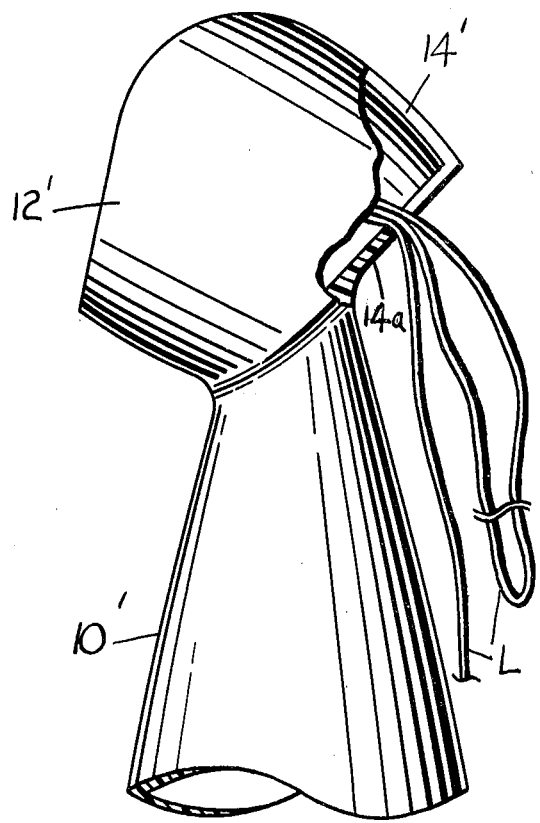
FIG. 10 is a fragmentary side elevational view, partly broken away, taken on the line 10—10 of FIG. 9.
Figure 11:
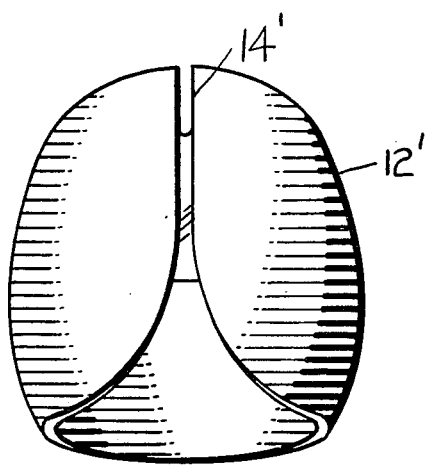
FIG. 11 is an end view taken on the line 11—11 of FIG. 9.

With reference to FIGS. 9, 10 and 11, an embodiment is illustrated which employs a buoyant body portion 10' as in FIG. 1 having an end cup 12'. In this structure, however, the cup 12' opens to the side instead of to the end. Such side opening allows free and unhindered separation of the weight from the cup as the bobber strikes the water upon being cast. The slot 14' for the line leads from the free end edge of the cup down the wall of the cup in a direction opposite from opening and partly into the bottom wall 14a of the cup.

The same control end 16 as in FIG. 4 is used in the FIG. 9 embodiment. Similarly also, the bobber is prepared for casting by pulling the line through the control end and inserting the weight W in the cup, the line to the weight extending through slot 14'. In the structure of FIG. 9 it is preferred that the cup 12' be sufficiently large that the bait B can first be laid in the cup and be held therein by the weight W as shown in broken lines in FIG. 9. This arrangement will hold the bait and hook in the cup and there is no danger that the bait will be thrown off the hook during casting. The operation of the bobber 10' is otherwise the same as the first embodiment.

It is to be understood that the form of my invention herein shown and described is to be taken as a preferred example of the same and that various changes in the shape, size and arrangement of parts may be resorted to without departing from the spirit of my invention, or the scope of the subjoined claims.

I claim:

1. A fishing bobber for use with a fish line connected to a fishing pole at one end and to a fish hook and weight at the other end, said bobber comprising
   (a) a buoyant body having opposite ends and being arranged to float normally in a horizontal position and also arranged to float in an upright position under the influence of a downward pull from a fishing weight,
   (b) a slot in one end of said body having a widened end arranged to receive the fish line for axial movement in said horizontal position of said body and having a narrowed end for gripping the fish line upon movement into a narrowed portion of said slot,
   (c) and guide means on said body arranged to form a guide path for the fish line after it extends from said slot,
   (d) said guide means having a portion thereof disposed beyond the narrowed end of said slot whereby the fish line in an upright position of said body is moved into gripping engagement with said slot to stop fish line movement relative to the float but in a horizontal position of said body is released from said slot to allow fish line movement relative to said bobber.

2. The fishing bobber of claim 1 including friction means on opposite sides of said slot for positively gripping the fish line.

3. The fishing bobber of claim 1 including a cup-shaped member on the end of said body opposite from the end with the control means arranged to receive a portion of fishing tackle for casting the bobber.

* * * * *